United States Patent

Bracegirdle

[11] Patent Number: 5,882,592
[45] Date of Patent: Mar. 16, 1999

[54] METHOD FOR PROCESSING WATER-BOUND WASTE

[76] Inventor: Paul E. Bracegirdle, 9 Crimson Leaf Dr., Newtown, Pa. 18940

[21] Appl. No.: 2,815

[22] Filed: Jan. 5, 1998

[51] Int. Cl.[6] .................................................. C02F 1/34
[52] U.S. Cl. ................... 422/32; 422/3; 422/38; 422/209; 422/225; 366/140; 366/180.1; 71/12
[58] Field of Search .................. 422/3, 28, 32, 422/38, 209, 224, 225; 366/140, 152.3, 152.5, 152.1, 180.1; 71/12

[56] References Cited

U.S. PATENT DOCUMENTS

| | | | |
|---|---|---|---|
| 4,193,206 | 3/1980 | Maffet | 71/12 |
| 4,293,242 | 10/1981 | Merjan | 405/239 |
| 5,302,179 | 4/1994 | Wagner | 71/12 |
| 5,422,015 | 6/1995 | Angell et al. | 71/12 |
| 5,482,528 | 1/1996 | Angell et al. | 71/12 |
| 5,653,796 | 8/1997 | Kawai et al. | 106/717 |
| 5,676,749 | 10/1997 | Takagi | 106/725 |

*Primary Examiner*—Krisanne Thornton
*Assistant Examiner*—Fariborz Moazzam
*Attorney, Agent, or Firm*—Daniel Kramer

[57] ABSTRACT

A method for processing water-bound wastes and for adjusting quantities and for combining ingredients to achieve a desired mechanical property of the mixture. The process includes the establishment of at least one input parameter for the ingredients. The ingredients include heated granular solids and contaminated water-bound wastes. The mixing process causes the water-bound waste to be heated to a temperature which assures neutralization or purification of any waste borne contamination and which simultaneously cools the granular solid. The method includes testing the mixture for satisfaction of at least one of the established mixture physical property limits and, if necessary, adjusting at least one input parameter to achieve the desired physical property value.

6 Claims, 2 Drawing Sheets

METHOD FOR PROCESSING WATER-BOUND WASTE

BACKGROUND

Among the greatest benefits which accrue to a civilized society are those which cause garbage and sewage wastes to "disappear". Although a city resident might generate only 3.5 lb of garbage waste and 1.5 lb. of sewage waste per day, even a small city of 250,000 population will have to dispose of 875,000 pounds of garbage and 375,000 pounds of sewage waste each day. Our political system has provided huge infrastructures to collect and dispose of this waste. Most garbage waste is deposited in landfills. Typically a landfill owner charges from fifty to one hundred dollars per ton for accepting garbage. At the $50.00 rate the above municipality has to budget $8,000,000.00 annually just to pay these "tipping" fees. The costs of collection and transport are extra.

To make matters worse, local landfills are filling up, mandating that garbage be transported further from its source. Our highways become clogged with huge trucks performing this odorous task.

In an effective attempt to address and minimize this problem, municipalities have established trash to energy plants which burn the garbage producing heat, use the heat to generate steam and the steam to generate electricity. The electricity is in turn sold to the local utility or sold to a local bulk electricity consumer.

The burning process reduces the mass of material to be disposed of by 85 to 90 percent, thereby reducing tipping costs and also extending the life of local landfills. However, the trash burning plant must first cool the fiery ash by soaking it with water which it must buy from the local water company and then pay a hauler to cart away the, now much heavier, wet ash. Water has become a scarce resource. Persistent droughts and high rates of usage have lowered water levels in lakes and rivers. Threats of water shortage abound.

Haulers in the past have always transported the cooled wet ash to the landfill and paid to tip it.

In other places, huge quantities of earth which have been contaminated by oil or in other ways are being incinerated to vaporize the contaminant oils. The hot earth must then be cooled and disposed of, just like the hot ash from the trash to steam plant or from coal burning power plants.

To address the sewage problem municipalities have invested in sewage disposal plants. Here settling tanks, water treatment and disinfectant facilities have been provided to separate the water from the solids and treat, purify and dispose of the water in rivers or streams. Even though the solids are squeezed to press out much of the water, the average water content of the pressed solids is 75 to 85 percent. In some locations the wet solids are heated by fuel burning furnaces to dry and disinfect them, and again disposed of in landfills. Fuel costs to achieve this drying and sterilization function by evaporating the residual water are high. This is because while it take considerable amounts of heat to heat water to the boiling point, it takes 7.5 times as much heat to evaporate the hot water as to heat it to the boiling point. Even without evaporating much of the water the fuel costs for heating the wet solids is very high because it takes roughly five times as much heat to raise the water component of the wet solids to a temperature of 190° F., the temperature required for effective sterilization, as it would have taken to heat the solids to that temperature if they had been dry.

FIELD OF THE INVENTION

Therefore among the general objectives of the invention are the specific objectives of employing the following ingredients in producing a product:

Hot Granular Solids: such as; hot soil from a thermal soil purification process, hot ash from a solid fuel burning power plant, hot ash from a trash to energy generator and hot ash from a trash incinerator.

Contaminated Water-Bound Wastes; including but not restricted to; waste from a municipal sewage system, ground fresh oyster shells, bottoms from chemical processes, fermentation waste and waste from river or stream bed dredging.

Though the following ingredients are named specifically, the process is intended to be applicable to other ingredients which have similar characteristics.

The above recitation was provided in an effort to make it clear that this invention is directed to the field of waste treatment and disposal.

It is further directed to a process for employing the waste heat in heated earth or hot ash to heat, sterilize, purify and boil away quantities of water associated with water bound waste.

It is further directed to means for monitoring and controlling said process to assure the production of a desirable product.

It is further directed to such a process where at least one physical or mechanical property value of the product output is measured, compared with an allowable range of such property values, and if outside the allowable range of such values, caused to correct or change an input parameter having the objective to cause the physical property value to change to such a value within the allowable range.

Therefore it is an objective of this invention to symbiotically combine at least some of the above described waste materials to both minimize the costs related to their treatment and safe disposal and to generate a product which, in itself, is either useful and saleable, or in the alternative, can be economically disposed of in landfills or elsewhere.

It is a further object to reduce the quantity of flowing water required to cool hot ash from a furnace.

It is a further object to synergistically combine the inherent qualities of the wet waste and the hot ash by combining the two in proportions adjusted to yield a product whose temperature history has included a wet waste temperature above 190° F.

It is a further object to effect such combination in a way that produces a product having defined and usable physical or mechanical properties without any consideration or measurement of the actual moisture content of the product.

SUMMARY OF THE INVENTION

A process for determining the proportions of hot ingredient and wet waste ingredient required to be mixed to produce a product having the required physical properties comprising:

providing an input of a hot material, providing an input of a wet, contaminated material, mixing the two materials, measuring a mechanical property of the mixture.

DETAILED DESCRIPTION OF THE INVENTION

The following description is directed to the application of the process to contaminated sewage waste as the wet waste material and the first ingredient of the process. This material will be referred to throughout as the wet contaminated ingredient (WCI). The description is further directed to the use of hot thermally decontaminated earth as the second ingredient, henceforth, hot ingredient (HI). In some cases, it may be desirable to provide a third ingredient to provide, augment or establish the required physical properties of the outflowing product. This third ingredient will be referred to as the auxiliary ingredient (AI).

Figure 1:
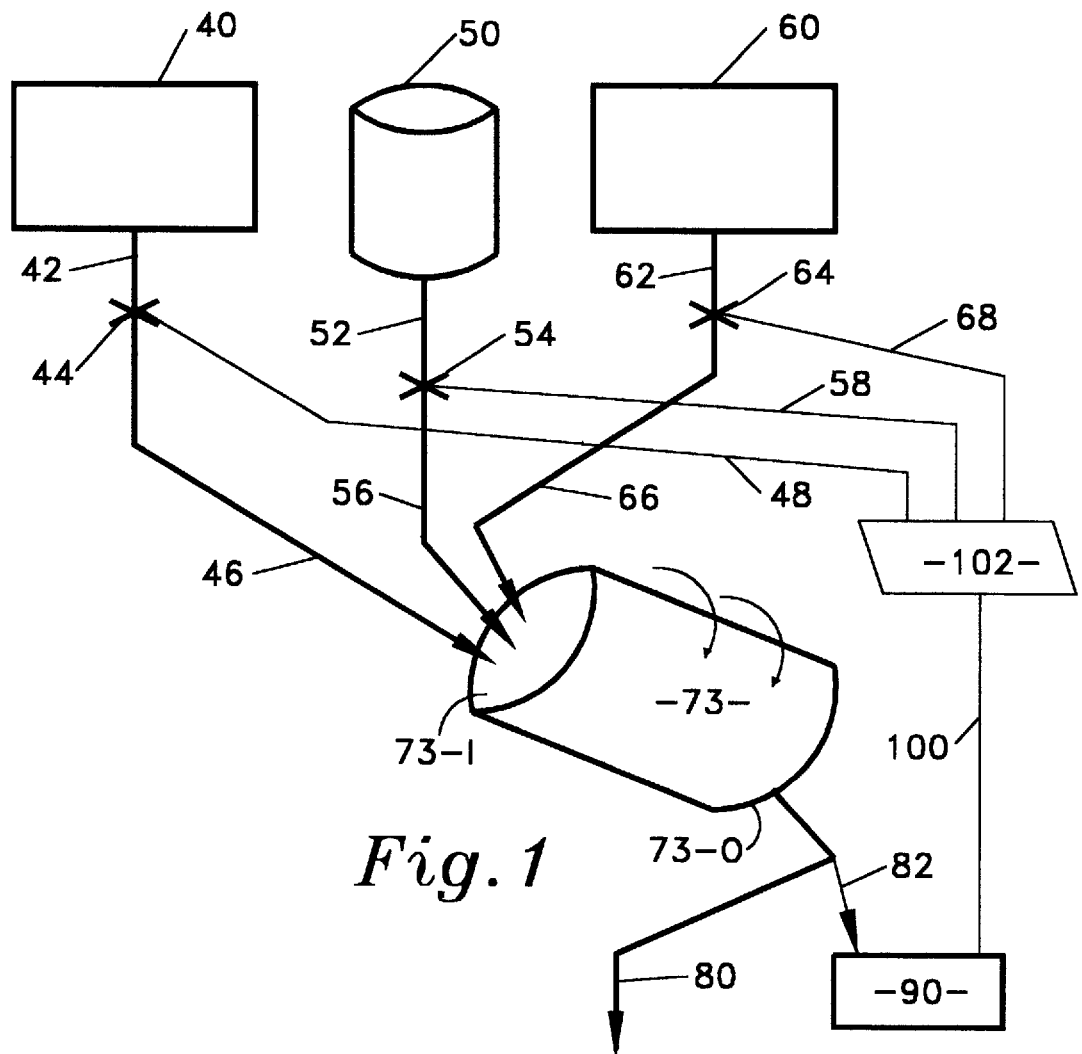
FIG. 1 is a schematic representation of the ingredient sources, the mixing, output, testing the output and feedback from testing to a logical controller which provides reset information to the ingredient flow controllers.

Referring now to FIG. 1 there is shown input reservoir 40 for containing and feeding a stream of the wet contaminated ingredient (WCI). Typically this WCI will be sewage sludge having a solids contents of about 25% and a temperature of about 60° F. There is shown input reservoir 60 for containing and feeding a stream of the hot ingredient (HI). Typically the HI will be hot decontaminated earth having a temperature between 450° F. and 750° F.

Reservoir 50 provides means for storing and feeding an auxiliary ingredient. In the preferred embodiment of the process the auxiliary ingredient is water but other or additional ingredients such as bentonite, for forming a product having reduced permeability to water, or sand for increased permeability or flowability may be desired. It should be noted that the term reservoir must not suggest any particular structure or lack thereof. For example, the reservoir for WCI may be simply a pile of the material. The reservoir for water may be a lake or river. The reservoir for hot earth or hot ash may be the furnace itself.

Each ingredient flows to a mixer 73 by a route or conduit. The WCI flows from reservoir 40 through path 42 where it encounters a flow control element 44. The flow control element may be in the form of a valve, a conveyor having a speed control or a bucket crane having an operator following a prescribed but changeable loading protocol. The hot ingredient flows from reservoir 60 via flow path 62 to control element 64 and the auxiliary ingredient, water, flows from its reservoir 50, via path 52, to control element 54. In the case of liquids such as water the preferred control element is a valve but any alternate flow control element such as a variable speed pump would also be suitable.

From each control element, the ingredients flow at their individual rate, the rate having been adjusted and controlled by the control element for each ingredient in a manner to be described, through or over paths or pipes 46, 66 and 56, respectively to the inlet end of mixer. In a preferred embodiment of the invention the mixer is in the form of a rotating drum 73 having an inlet end 73-I and an outlet end 73-O and a length D. The drum is pitched down in the direction of flow so that the inlet end is physically higher than the outlet end. All the ingredients are placed in the mixing drum at its inlet end. In alternate versions of the inventions, some ingredients are placed in the drum at its inlet end and one or more ingredients are placed in the drum at a position intermediate the inlet and outlet ends, at a distance d from the inlet end.

Other forms of mixer can be employed within the context of the present invention and the present invention may be applied to any form or type of mixer, including a batch type mixer where all the ingredients are placed in the batch mixing process at the same time so that all the ingredients are exposed to the same mixing duration or a two stage batch type mixer where the WCI and HI are mixed in the first stage and the auxiliary ingredient/s is added before the output of the first mixing stage is placed in the second mixing stage.

The ingredients, having been thoroughly mixed so that the hot ingredient HI has had an opportunity to affect and heat substantially every particle of the WCI to a temperature sufficiently high to achieve the desired cleaning or sterilization effect, now constitutes product 78. Product 78 now flow from mixer outlet 73-O via path 80, to a product storage or usage area (not shown). Enroute to the product storage or usage area, a branch path 82 conveys a portion of the flowing product 78 to a test site 90. At test site 90 physical or mechanical property test protocols perform one or more tests of the properties of the product. The tests are performed for the purpose of determining whether the flow rate or quantity of any ingredient must be increased or decreased in order to change one or more of the measured physical properties of product 78 from a value deemed less satisfactory to a more satisfactory value.

A primary intermediate or final property of product 78 is its temperature, since every portion of the WCI must be assured of having reached the sterilization temperature of 190° F. In addition to the temperature of the product, among the other physical properties which the test protocol may test are: resistance to static slump; dynamic slump; density; propensity to flow; free water, here defined as water which flows or leaks from a test mass placed in a perforated container or the like, and resistance to shear or to penetration. The test protocol may require that the product first be compacted by rodding or compressed according to a protocol or treated in some other way prior to or as part of the protocol. The actual physical property test protocol must be selected by the user of the product to ensure that the product has the physical properties she requires.

Figure 3:
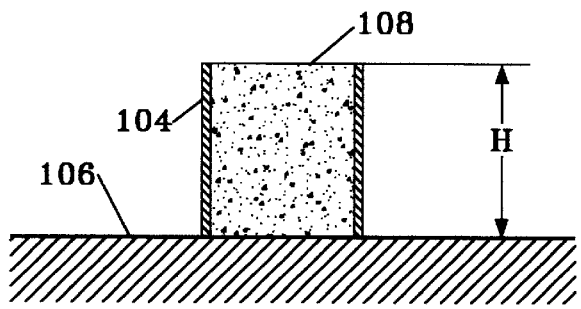
FIGS. 3, 4, 5, 6, 7 and 8 illustrate physical property tests for the product for providing input to a logical process which determines whether any change in the ingredient flow settings is required.
Figure 4:
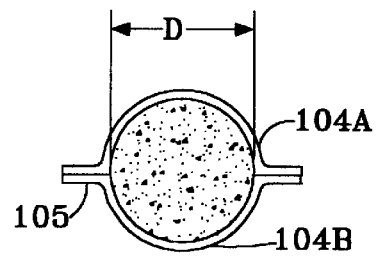
Figure 6:
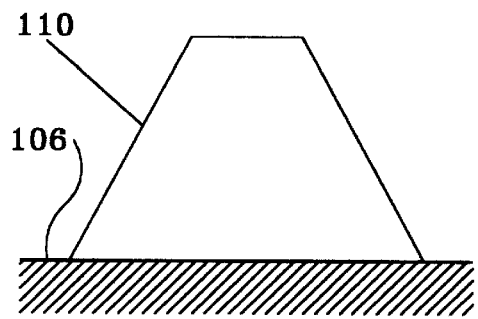

For example, the user may require a slump test. In FIGS. 3, 4 and 6 are shown typical forms for testing of slump. The cylindrical form 104 of FIGS. 3 and 4, has diameter D and height H. The form 104 is overfilled with the product 78 sample from path 82 while resting on base or anvil 106. The contents of form 104 are rodded to compactness and struck off level, so that a compacted mass 108 having the diameter D and height H of the form 104 is prepared. Another user may require tamping prior to test, instead of rodding. The form 104 is then removed. The form may be a simple cylinder where the compacted test sample 108 is pushed out by a plunger, or, in the alternative, the form may be in the form of the segmented cylinder of FIG. 4 whose parts are clamped together during the compaction and leveling process and then separated.

Figure 5:
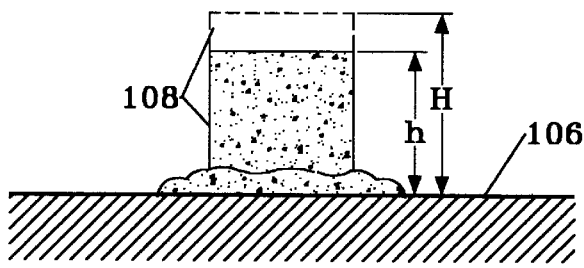
Figure 7:
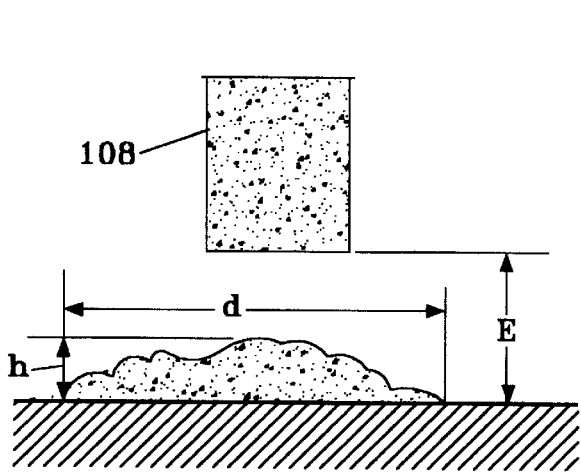

In FIG. 4 there is shown an end view of a segmented cylinder having segments 104A and 104B with flanges 105. Before filling, the flanges 105 are clamped together. When the filling and compaction is complete, the flanges 105 are unclamped and the segments 104A and 104B are released and separated leaving a compacted test sample 108 resting on anvil 106. In one test sequence the sample is allowed to rest on the anvil for a predetermined time and the residual height h is measured (FIG. 5). In another test sequence, not shown, the anvil 106 bearing the test sample 108 is dropped repeatedly from a predetermined height and then the residual dimensions of the test sample measured. In another sequence the test sample 108 itself is dropped on the anvil from a height E as shown in FIG. 7. In each case the residual height h is compared with the initial height H and/or the residual base diameter d is compared with the initial diameter D.

User limits of D/d and or h/H are provided and excursions of the product outside these limits are corrected by the addition or reduction of auxiliary ingredient 50 or by increase or diminution of the quantity of ingredient 40 or 60, always monitoring the temperature of the mixture to be sure the critical temperature is met or exceeded.

Another form of the slump test form is shown in FIG. 6. As employed in testing concrete, a form 110 in the shape of a frustrum of a cone having a height of 12 inches and a base diameter of 8 inches and a top diameter of 4 inches is employed. In use the cone 110 is inverted on base 106 and filled like a funnel, the product 78 being rodded or tamped for compactness. The form is then inverted with its greater diameter base resting on anvil 106. The form is removed and the slump observed and measured as described in connection with FIG. 5.

In another test the sample 108 is weighed and the density calculated. The tests may be conducted by a human operator or by some automated procedure. In each event, the observed value for the physical property is compared with a predetermined standard value for that property and a difference exceeding a predetermined amount invokes a change in the setting or adjustment of one or more of the flow control elements 44, 64 or 54 by way of feed-back routes 48, 68 or 58 respectively, thereby increasing or decreasing the quantity or the flow rate of the ingredient controlled thereby.

If the test protocol indicates that the product 78 has not reached or exceeded the critical temperature, the ratio of hot ingredient to WCI must be increased either by opening or adjusting control element 64 to allow a greater quantity of HI to flow or by acting on one or more of the other flow controllers 44 and 54 to reduce the flow rate or quantity of their ingredients.

It is understood that in the above embodiment of the invention the test protocols and the adjustment of the ingredient flows are carried out manually. In another embodiment of the invention the test protocol 90 is carried out by a computerized test process where the test data is transmitted via path 100 to a logical device 102 into which the predetermined standard or desired values for the physical properties under test by protocol 90 has been stored. Each test value transmitted via path 100 to the logical device is compared with the standard and if the difference exceeds a predetermined value, the appropriate adjustments to the flow control elements 44, 64 and 54 are performed via action paths 48, 68 and 58 respectively.

Figure 2:
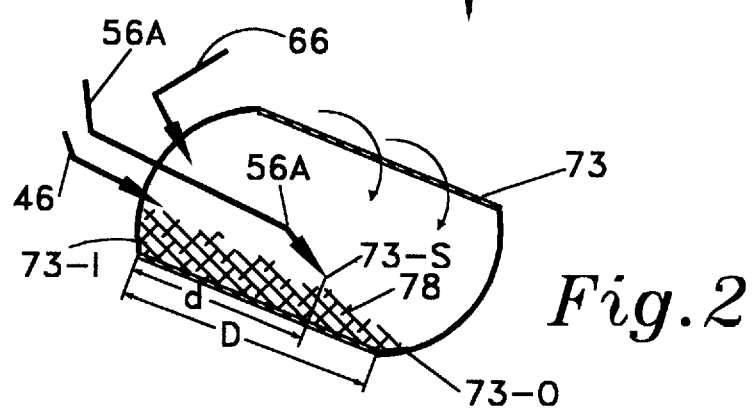
FIGS. 2 shows the input position within the mixing device for an auxiliary ingredient.

Referring now to FIG. 2, there is shown a cross-section of mixing cylinder 73 where the entry positions of the WCI and the HI to the mixer 73 are at the inlet end 73-I. This is the position where the maximum mixing length D or associated mixing time is secured, by virtue of the ingredients being required to traverse the entire mixing length D of the mixer 73. However, the entry point of the third ingredient 50 is by way of flow path 56A which is so positioned that the third ingredient 50 enters the mixing process at position 73-S, a distance d from the mixer inlet 73-I, the entry position of the HI and WCI. This entry point provides a reduced mixing path or mixing time, (D-d)/D. Therefore the HI and WCI are exposed to mixing for a first time period and produce an intermediate product before the entry of the third ingredient 50. This intermediate product must have a temperature in excess of the sterilizing temperature. Only when that condition has been satisfied is the third ingredient 50 added at point 73-S. The three ingredients are then mixed for a second time period before leaving the mixer drum 73.

In the event the mixing process being employed is a batch process, then the time for entry of the third ingredient is later than the time for entry of the WCI and HI into the batch mixing process. In the batch case, the total mixing time is T and the mixing time to the time of entry of the auxiliary ingredient is t, the first time period. Therefore the mixing time for the auxiliary ingredient is (T-t), the second time period, thereby generating the same relationship for the relative mixing times as in the rotary mixing case. In those cases where ingredient 50 is cold and especially where ingredient 50 has a high specific heat and is difficult to heat, such an arrangement allows the WCI to be heated to the required process temperature for effective sterilization before the intermediate product is cooled by the addition and mixing of ingredient 50 to produce final product 78.

This improvement provides a significant advantage over earlier methods since the HI now can heat the WCI in the presence of only relatively small amounts of ingredient 50, primarily water. Then, the ingredients having been thoroughly mixed and their temperatures equalized at the desired high sanitizing temperature, can have the third ingredient 50, such as water, be added to the now sterilized ingredients. This improvement allows smaller quantities of HI to be employed and allows the intermediate temperatures of the mixture to be raised to a higher level before the third ingredient 50 is added, thereby providing better sterilization.

Figure 8:
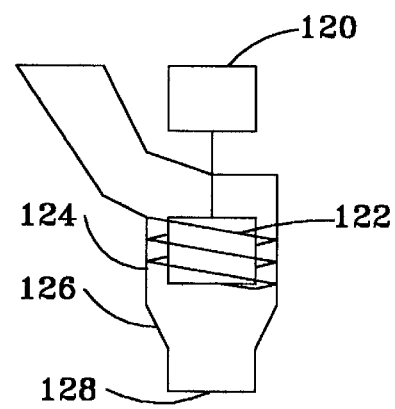

While the above physical property tests are batch type and most often carried out manually, continuous automatic monitoring of physical properties, providing digital outputs suitable for input to a computer control protocol can be easily performed. One form of such a monitoring system is shown in FIG. 8. There, a motor 120 drives screw-type feeder 122 positioned within casing 124. The screw feeder 122 forces product 78 through a funnel-type contraction 126 in the outlet pipe 128. The load on the driving motor 120 constitutes a continuous measure of the flowability of the product 78. The load on motor 120, as characterized by a measurement of motor current or wattage, thereby continuously provides the information necessary for the logic device 102 to adjust the quantities of ingredients 40, 50 and/or 60 via control paths 48, 58 or 68, acting on flow controls 44, 54 and 64 respectively, as required.

From the foregoing description it can be seen that the present invention comprises an advanced system for adjusting the quantities or ratios of ingredients measured into a waste purification process for producing a usable product. It will be appreciated by those skilled in the related arts that changes could be made to the manifestations of the invention described in the foregoing description without departing from the broad inventive concepts embodied therein. It must be understood, therefore, that the protection provided by this patent are not to be limited to the particular manifestations or embodiments of the inventions disclosed but are intended to cover all modifications and equivalents thereof which are within the scope and spirit of the inventions as defined by the appended claims as interpreted by the above disclosure.

I claim:

1. A process for producing a sanitized product from contaminated waste in a mixing process occurring along the length of a rotating drum, the process comprising the steps of:

providing a first quantity of waste, providing a second quantity of a granular ingredient, said second quantity being sufficient to raise the temperature of said waste to at least 190° F. when mixed together, introducing the waste and granular ingredient to an inlet of the rotating drum to form a first mixture in a beginning state, conveying the first mixture to an intermediate inlet position within the rotating drum to establish an intermediate state where the first mixture has achieved a temperature of at least 190° F., adding a third ingredient to said first mixture at the intermediate inlet position for affecting a mechanical property of the first mixture, mixing the third ingredient with the first mixture, between the intermediate inlet position and a drum outlet to establish an end state which produces a second mixture having said affected mechanical property.

2. A process for producing a sanitized product from a contaminated waste in a mixing process having two stages, the process comprising the steps of:

providing a first quantity of waste, providing a second quantity of a granular ingredient, said second quantity being sufficient to raise the temperature of said waste to at least 190° F. when mixed together, introducing and mixing the waste and granular ingredient at a first stage to form a first mixture in a beginning state, conveying the mixture to the end of the first stage, the first mixture forming an intermediate state by achieving a temperature of at least 190° F. and thereby producing a sanitized first mixture, adding a sufficient quantity of a third ingredient to said sanitized first mixture at the intermediate state and beginning of a second stage to form a second mixture, mixing the second mixture to achieve a predetermined mechanical property in said second mixture at an end of the second stage.

3. A process as recited in claim 2 further providing means for testing the second mixture for the value of the mechanical property, comparing the value with a desired value, adjusting the quantity of the third ingredient to change the value in the direction of the desired value.

4. A process as recited in claim 3, further providing that the mechanical property comprises a ratio between an initial dimension and an equivalent slumped dimension as provided in a slump test.

5. A process as recited in claim 3 further providing that the mechanical property is resistance to flow of the product through a flow restriction.

6. A process as recited in claim 2 further providing that the ratio of time elapsed, between an element of the mixture traversing the first state and the same element reaching the intermediate state, to the time elapsed between the element passing the intermediate state, at which the third ingredient is added, to the end state is greater than six to one.

* * * * *